United States Patent [19]

Iwata et al.

[11] Patent Number: 5,506,026

[45] Date of Patent: Apr. 9, 1996

[54] WOOD BOARD AND A FLOORING MATERIAL MADE THEREFROM

[75] Inventors: Ritsuo Iwata; Satoshi Suzuki; Hirotosi Takahasi; Takayuki Endo, all of Hamamatsu, Japan

[73] Assignee: Yamaha Corporation, Japan

[21] Appl. No.: 248,704

[22] Filed: May 25, 1994

[30] Foreign Application Priority Data

| May 31, 1993 | [JP] | Japan | 5-129669 |
| Oct. 29, 1993 | [JP] | Japan | 5-272674 |
| Nov. 9, 1993 | [JP] | Japan | 5-279911 |

[51] Int. Cl.$^6$ ................... B32B 5/12; B27M 3/00
[52] U.S. Cl. .................. 428/107; 428/109; 428/113; 428/114; 428/215; 428/528; 428/537.1
[58] Field of Search .................. 428/215, 537.1, 428/528, 113, 114, 107, 106, 109

[56] References Cited

U.S. PATENT DOCUMENTS

| 3,164,511 | 1/1965 | Elmendorf. | |
| 4,246,310 | 1/1981 | Hunt et al. | 428/106 |
| 4,492,726 | 1/1985 | Rosenberg | 428/192 |
| 4,494,919 | 1/1985 | Knudson et al. | 425/83.1 |
| 4,751,131 | 12/1992 | Barnes | 428/215 |

OTHER PUBLICATIONS

"Wafer Board In Residential Construction", The Wafer-Board Association, 1983 (Publication Date is unknown).
"OSB and Wafer Board In Wood Frame Construction", Structural Board Association, 1991/92 Edition (Publication Date is unknown).

*Primary Examiner*—P. C. Sluby
*Attorney, Agent, or Firm*—Ostrolenk, Faber, Gerb & Soffen

[57] ABSTRACT

The present invention provides a wood board, and a flooring material using this, which uses thin wooden strands as a raw material, has superior surface smoothness, and possesses sufficient strength and rigidity. The wood board in accordance with the present invention comprises a core layer 1 comprising a strand board, and a surface layer 2 comprising a oriented strand board which is laminated on at least one surface of the core layer 1; the surface layer 2 comprises thin wooden strands which are thinner than the thin wooden strands comprising the core layer, and furthermore, the flooring material of the present invention is obtained by laminating a decorative single sheet onto at least one of the surface layers 2 of the wood board. The wood board and flooring material in accordance with the present invention have high strength and superior surface smoothness. Furthermore, if a specified water-repelling agent is added to the binder which is used in molding, it is possible to obtain a wood board having superior water resistance. Furthermore, the present invention makes effective use of raw materials which were conventionally considered to be waste materials, so that it is possible to conserve forest resources, and to reduce raw material costs.

10 Claims, 4 Drawing Sheets

WOOD BOARD AND A FLOORING MATERIAL MADE THEREFROM

FIELD OF THE INVENTION

The present invention relates to a wood board and to a flooring material, and in particular, relates to a wood board comprising thin wooden strands, having a smooth surface, light weight, and sufficient strength and rigidity, and having superior resistance to moisture.

BACKGROUND ART

There have recently been problems such as the lack of lumber resources and the protection of forests, and it is clear that the felling of forests will become increasingly difficult in the future. Accordingly, it is expected that the supply of board materials such as plywood or the like produced using large amounts of raw lumber materials will become uncertain or insufficient, and it is further expected that the price thereof will increase greatly. Accordingly, wood boards which are obtained through the effective use of thin strands of wood or the ligneous fibers of wood strands, which were conventionally viewed as waste material, have attracted attention, and the application of such wood to various uses has been strongly desired.

In wood boards employing thin wooden strands, ligneous fibers, or the like, the thin wooden strands, ligneous fibers, or the like which comprise the structural elements are commonly integrated by means of a binder and are then molded into an integral structure. At this time, as the dimensions of the structural elements become smaller, the wood board which is obtained becomes homogeneous, and the surface becomes smooth; however, the strength and rigidity thereof decline, and the density increases. When, on the other hand, the dimensions of the structural elements become larger, the strength and density of the wood board approach those of natural lumber; however, such wood boards are non-homogeneous, and the unevenness of the surface thereof tends to increase.

A flooring material such as that shown in FIG. 5, in which a decorative single sheet 3 is bonded to one side of plywood 31, is commonly used. The plywood serving as the raw material of this type of flooring material comprises a board in which a plurality of single sheets of veneer or the like are bonded and layered one atop the other so that the grain directions thereof are perpendicular to one another; this plywood possesses sufficient strength and rigidity for use as flooring material, and the surface thereof is smooth.

Accordingly, in order to use the wood board described above in applications as flooring material in place of plywood, it is necessary that the wood board possess strength and rigidity which is equal to or greater than that of plywood, and furthermore, that the surface thereof be smooth.

However, while commonly-known fiber boards using ligneous fibers obtained by the breakdown of wood as structural elements, for example, possess uniform and smooth surfaces, the strength thereof is insufficient for use as flooring material, and when such wood boards are made thicker in order to increase the strength thereof, the density increases, so that the weight thereof increases, and such boards become difficult to handle.

Furthermore, as shown in FIG. 4, in oriented strand boards, in which thin wooden strands 21 are arranged in essentially the same direction and bonded by means of a binder and then molded into an integral form, the strength is improved, but the surface is non-uniform and possesses great unevenness.

Furthermore, in this type of oriented strand board, the strength is improved; however, such boards are deformed greatly in response to changes in humidity, and whereas plywood has a water-absorption thickness expansion coefficient within a range of 3–5%, based on JIS-A 5908 (Japanese Industrial Standard), the value of this expansion coefficient for conventional oriented strand boards is within a range of 10–20%. Accordingly, even if a smooth surface can be obtained by means of abrasion or the like, the individual thin wooden strands comprising such oriented strand boards are subject to expansion and contraction as a result of changes in humidity, and the smoothness of the surface may be thereby lost.

Accordingly, it was difficult to employ such oriented strand boards as surface layer materials. Furthermore, even in flooring material in which a surface decorative layer such as a veneer or the like having a thickness of approximately 0.3 mm is bonded to the surface of such an oriented strand board, as a result of changes in humidity, irregularities appear in the oriented strand board lying beneath the surface of the flooring material, and this was inappropriate for this type of surface decorative material. In particular, under extremely humid environments, deformation resulting from moisture absorption presented a serious problem.

Attempts were made to prevent deformation as a result of changes in humidity by adding wax as a waterproofing agent to the binder when forming the oriented strand boards; however, it was difficult to uniformly disperse wax, which is an organic material, in the aqueous binder commonly employed as the binder for the oriented strand boards, so that the waterproofing agent is ununiformly distributed in the oriented strand boards. As a result deformation, due to changes in thickness under humid circumstance developed in those portions in which there was little waterproofing agent. Thus sufficient effects could not be obtained.

SUMMARY OF THE INVENTION

The present invention has as an object thereof to provide a wood board which uses thin wooden strands as a raw material, has superior surface smoothness, possesses sufficient strength and rigidity, and also has superior resistance to moisture.

The present invention achieves the above object by providing a wood board which comprises a core layer comprising a strand board and a surface layer, on at least one surface of the core layer, comprising a oriented strand board, characterized in that the surface layer comprises thin wooden strands which are thinner than the thin wooden strands used in the core layer.

The wood board in accordance with the present invention uses a strand board as a core layer, and on at least one surface thereof, a oriented strand board, comprising thin wooden strands which are thinner than the thin wooden strands comprising the core layer, is layered as a surface layer, so that the board possesses high strength, and furthermore, by simultaneously forming the core layer and the surface layer, even if localized variations in hardness or thickness are present in the core layer, it is possible to ensure the smoothness of the entire surface of the wood board.

Furthermore, by employing foaming binder in the core layer, it is possible to reduce the density, and thus it is possible to obtain a wood board which is light and has high strength.

Furthermore, by adding a specified water repellent agent to the binder during formation, the resistance to humidity is improved throughout the wood board, so that, for example, it is possible to reduce the moisture absorption thickness expansion coefficient to a value of less than 5%.

Accordingly, for example, flooring material which is formed by the bonding of a decorative sheet to the surface of such a wood board has flexural strength which surpasses that of flooring material using conventional plywood, has superior resistance to humidity, and is capable of use as a flooring material even in a highly humid environment.

Furthermore, by acetylating the thin wooden strands comprising the surface layer, it is possible to improve the insect-proofing, rot-proofing, bacteria-proofing, and dimensional stability of the wood board and the flooring material.

By means of the wood board and the flooring material in accordance with the present invention, it is possible to effectively use raw materials which were conventionally regarded as waste materials, and thus to protect lumber resources. Furthermore, such raw materials have low costs, and it is thus possible to reduce raw material costs.

DETAILED DESCRIPTION OF THE INVENTION

Hereinbelow, the wood board of the present invention will be explained in detail.

Figure 1:
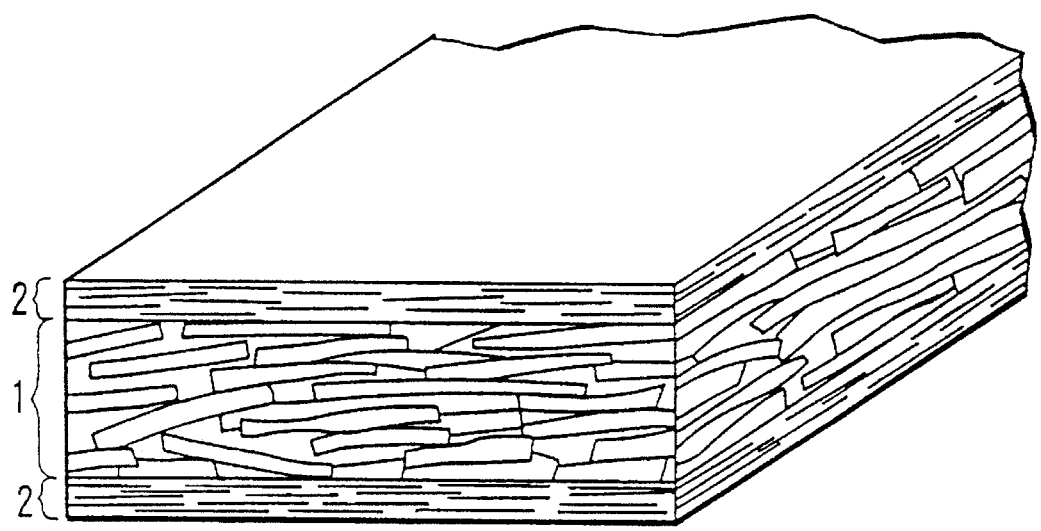
FIG. 1 is a diagram showing an example of a wood board in accordance with the present invention.
Figure 2:
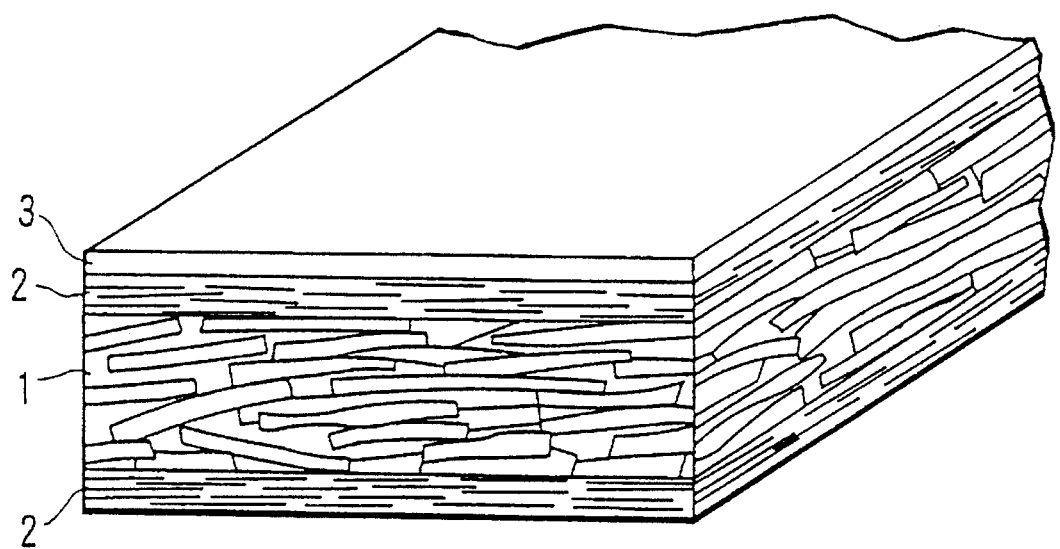
FIG. 2 is a cross sectional view showing an example of a flooring material in accordance with the present invention.

FIG. 1 shows an example of a wood board in accordance with the present invention; in the FIG. 1, reference numeral 1 indicates a core layer, comprising a strand board. Surface layers 2, comprising oriented strand boards using thin wooden strands which are thinner than the thin wooden strands comprising core layer 1, are laminated on both surfaces of this core layer 1.

Herein, what is meant by a "oriented strand board" is a board in which the thin wooden strands comprising the board are arranged so that the grains thereof run in essentially the same direction, and these are bonded using a binder and formed into an integral board; however, it is not necessary that all of the thin wooden strands employed be arranged in the same direction, rather, it is sufficient if approximately 70% or more of the thin wooden strands have grains arranged in the same direction.

In the strand board comprising the core layer 1 of the wood board of the present invention, thin wooden strands are used which have an average thickness within a range of 0.60–0.90 mm, and in which the absolute value of the thickness is within a range of 0.50–1.50 mm. Here, what is meant by the absolute value of the thickness acquired by averaging thickness measured at a number of different places on a wooden strand; what is meant by the average thickness is a thickness value acquired by averaging every average value of thickness of every wooden strand to be employed. Furthermore, it is preferable that the length of the thin wooden strands to be used in the core layer be within a range of 20–100 mm, and that the width thereof be within a range of 2–60 mm. Thin strands of Japanese red pine, latch, silver fir, fir, aspen, lodgepole pine, or the like may be advantageously employed as the thin wooden strands; however, no particular restriction is made with respect to the type of tree.

It is preferable that these be parallely oriented in essentially a single direction. In such a case, it is more preferable that the direction of the arrangement be oriented to across to the arrangement direction of the thin wooden strands comprising the surface layers which are described hereinbelow; however, this is not necessarily so limited, and can be freely selected.

It is preferable that the thin wooden strands comprising the core layer 1 be bonded using a foaming binder, and formed into an integral board. This foaming binder binds the thin wooden strands in core layer 1 to one another, and creates foam; it is preferable that the resin component be present at only the intersection points between thin wooden strands, while the small gaps between thin wooden strands be enlarged by foam cells, and the amount of resin component used is thereby reduced, and thereby a core layer 1 having a reduced density can be employed. In the present specification, the binder which has the characteristic of foaming is termed a "foaming binder", and the foaming binder which has completed the process of foaming is termed a "foamed binder".

This type of foaming binder may comprise self-foaming resin, or may comprise a non-foaming resin and a foaming agent. Self-foaming resin has unsaturated isocyanate to be formed into foam polyurethane resin and the like. Unsaturated isocyanate reacts with hydrogen squeezed from constituent strands during hot press process for integration, thereby generate carbon dioxide to form urethane foam. (As a result, volume of resin becomes twenty to thirty times.) Examples of non-foaming resins which are made to foam by means of a foaming agent include, for example, polyurethane resin, polystyrene resin, epoxy resin, polyvinyl chloride resin, phenol resin, urea resin, or mixtures thereof. Examples of the foaming agent include volatile foaming agent, for example, $CCl_3F$, $CCl_2F_2$, $CCl_2F\text{-}CClF_2$, or the like, or pyrolytic foaming agents, for example, azodicarbon amide, azohexahydrobenzonitrile, 2,2'-azoisobutylonitrile, benzene sulfohydrazide, N,N'-dinitroso-N,N'-dimethyl-terephthal amide, or the like. The temperature of non-foaming resin and foaming agent is primary raised over melting point of the non-foaming resin (e.g. 120° C.) to poet thee resin; secondary raised up to the temperature which gas belows out of the foaming agent (e.g. 140° C.).

Furthermore, the foaming binder may contain a non-foaming binder such as urea resin, melamine resin, phenol resin, polystyrene resin, epoxy resin, polyvinyl chloride resin, or a mixture thereof. It is possible to appropriately adjust the mixing ratio in accordance with the desired density and the like of the board comprising wooden material; however, it is preferable that the mixing ratio of the foaming resin and the non-foaming resin be within a range of 1:4–4:1. However, this is not necessarily so limited, so that a foaming binder, or non-foaming binder such as those described above, or a mixture thereof, may be employed as the binder.

It is preferable that the thickness of the core layer 1 be within a range of 5 mm–13 mm. Furthermore, the density thereof is preferably within a range of 0.40–0.75 g/cm$^3$, and more preferably within a range of 0.40–0.65 g/cm$^3$. If the density is less than 0.40 g/cm$^3$, the strength of the board will be insufficient, while on the other hand, when the density exceeds 0.65 g/cm$^3$, the weight of the material as a whole increases and it becomes difficult to handle.

The flexural Young's modulous of the strand board comprising the core layer 1 should preferably be within a range of from 35–80×10$^2$ MPa. When the flexural Young's modulous is less than 35×10$^2$ MPa, the deflection when used in wood boards exceeds the stipulated value, while when the flexural Young's modulus exceeds 80×10$^2$ MPa, then the optimum degree of elasticity required when a person walks there upon is insufficient.

In the wood board in accordance with the present invention, the surface layer 2, which is laminated on at least one surface of the core layer 1 described above, should preferably comprise thin wooden strands having an average thickness within a range of 0.20–0.50 mm, and an absolute value of the thickness within a range of 0.08–0.60 mm. In this surface layer 2, thin wooden strands having the thickness described above are parallely oriented essentially in one direction and are formed into an integral board using a binder to form a directional thin wooden strand laminated board. The arrangement direction of the thin wooden strands is not particularly limited; however, it is preferable that this direction be parallel to the longitudinal direction of the board comprising wooden material.

The thin wooden strands comprising this surface layer 2 should preferably have a length within a range of 20–100 mm, and more preferably within a range of 50 mm or more, and should have a width within a range of 2–60 mm, and more preferably within a range of 2–30 mm. If the average thickness of the thin wooden strands exceeds 0.50 mm, or the absolute value of the thickness exceeds 0.60 mm, then the surface of the board comprising wooden material which is obtained will not be smooth. More preferably, thickness off wooden strand for the surface layer 2 is less than 0.3 mm. In the present invention, an integrated strand board for floor element is defined to be smooth: a depression appeared on thee surface thereof is 2.0 mm or less in diameter and 0.3 mm or less in depth. The reason is as follows:

A decorative board is pressed with binder on the strand board to improve surface appearance. The decorative board is thin enough to be plastic deformation (e.g. 0.3–0.5 mm). Hence, depressions appeared on the strand board is filled with the deformed decorative board. The integrated floor board, covered with the decorative board, becomes free of visible depression.

Thin strands of Japanese red pine, larch, silver fir, fir, aspen, lodgepole pine, or the like may be appropriately employed as the thin wooden strands; however, no particular restriction is made with respect to the type of tree.

It is preferable that the thin wooden strands comprising the surface layer 2 be acetylated in advance. In the case in which the thin wooden strands are acetylated, it is preferable that after the thin wooden strands have been desiccated so as to have a water content of less than 3%, and preferably less than 1%, the thin wooden strands be brought into contact with a vapor of acetic acid, acetic acid anhydride, chloroacetic acid, or the like, and be acetylated in the gas phase (a degree of acetylation within a range of 12–20%).

The thin wooden strands comprising the surface layer 2 are bonded by means of a binder and are molded into an integral board. A foaming binder such as those described above may be used as the binder employed in the surface layer 2, or a non-foaming binder, or a mixture thereof, may be employed; however, from the point of view of releasability from the metal mold for molding, it is preferable that a non-foaming binder be chiefly employed in practice. The mixing ratio thereof can be appropriately set in consideration of the desired density of the surface layer 2 and the releasability thereof.

It is preferable that the thickness of the surface layer 2 be within a range of 1–5 mm, and more preferably within a range of 1–3 mm. Furthermore, the density of the surface layer 2 should be preferably within a range of 0.40–0.75 g/cm$^3$, and more preferably within a range of 0.40–0.65 g/cm$^3$. If the density is less than 0.40 g/cm$^3$, then the strength of the board will be insufficient, while when the density exceeds 0.65 g/cm$^3$, the weight of the material as a whole will increase and it will become difficult to handle.

The flexural Young's modulus of the directional thin wooden strand laminated board comprising the surface layer 2 should preferably be within a range of 35–80×10$^2$ MPa.

The amount of binder applied to the thin wooden strands comprising the core layer 1 and the surface layer 2 of the wood board in accordance with the present invention should preferably be within a range of 3–30 parts by weight with respect to 100 parts by weight of the thin wooden strands of each layer, and more preferably within a range of 5–15 parts per weight. When the amount of binder is less than 5 parts per weight, the strength of the wood board is gradually reduced, while when the amount of binder exceeds 15 parts per weight, the strength does not increase, but the density increases and the impression of natural wood is lost. In a practical use for floor element, 3 parts per weight is sufficient.

In the wood board in accordance with the present invention, it is preferable that water-repellent agent be added to the binder which is applied to the thin wooden strands comprising the surface layer 2 and the core layer 1. This water-repellent agent comprises an aqueous emulsion of an anion emulsifier and paraffin wax, and the amount of this anion emulsifier which is employed should be less than 10%. A "paraffin wax" is defined as a wax employing a paraffin hydrocarbon as a chief component thereof, and it is preferable that the melting point thereof be within a range of 50–60° C. Furthermore, this water-repellent agent is added in an amount within a range of 0.8–5.0 parts per weight in solid component conversion with respect to 100 parts per weight of thin wooden strands. If the amount added is less than 0.8 parts-per weight, then the increase in resistance to moisture is small thereby suppressing of thickness swelling cannot be achieved, while when the amount exceeds 5.0 parts per weight, the manufacturing costs increase.

The anion emulsifier described above is not particularly limited, insofar as it is a conventionally used anion-type emulsifier; however, it is preferable that a specially denatured soap be employed.

The water-repellent agent used in the present invention comprises an aqueous emulsion of the anion emulsifier and paraffin wax, and it is preferable that the emulsion have a solid component of approximately 50%.

Furthermore, the water-repellent agent is preferably added to both the core layer and the surface layer; however, the water-repellent agent may be added to only the surface layer, and thus it is possible to economize on the use of the water-repellent agent.

In the wood board in accordance with the present invention, it is preferable that the surface layers 2 be laminated on both surfaces of the core layer 1, and in such a case, it is preferable that surface layers 2 comprising the same type of oriented strand board be laminated on both surfaces. Furthermore, in the present invention, it is preferable that the board in which a binder is applied to the thin wooden strands comprising core layer 1 and the board in which a binder is applied to the thin wooden strands comprising surface layer 2 be formed by means of dry forming, and that these then be simultaneously molded by thermal compression. Specifically, the wood board is formed as follows:

(1) Wooden strands arranged in essentially a single direction are provided. And binder is mixed therewith. The mixture of the wooden strands and binder are placed on a thermal compression plate to constitute one of the surface layer 2.

(2) Following the step (1), wooden strands in essentially a single direction, preferably arranged to be oriented to across the direction of the wood strands off the surface layer 2, are provided on the surface layer 2. And a foaming binder or mixture of a non-foaming binder and foaming agent is provided thereon to constitute core layer 1.

(3) Subsequently to the step (2), wooden strands arranged in essentially a single direction same as one of the surface layer 2 are provided on the core layer 1. And binder is mixed therewith to constitute other surface layer 2.

(4) The laminated structure is pressed in the thermal compression plate to form a three-layered body.

Next, this three-layer body is subjected to thermal compression in a thermal compression molder and is subjected to simultaneous thermal compression and molding. The thermal compression conditions should preferably be such that the pressure is within a range of 1–2 MPa, the temperature is within a range of 150–230° C. and the time period should be within a range of the desired thickness (mm)× 5–120 seconds.

It is preferable that the wood board in accordance with the present invention which is obtained in this manner have a density within a range of 0.4–0.75 g/cm$^3$, and that the flexural Young's modulus be within a range of 35–80×10$^2$ MPa.

Next, the flooring material of the present invention will be explained.

Figure 3:
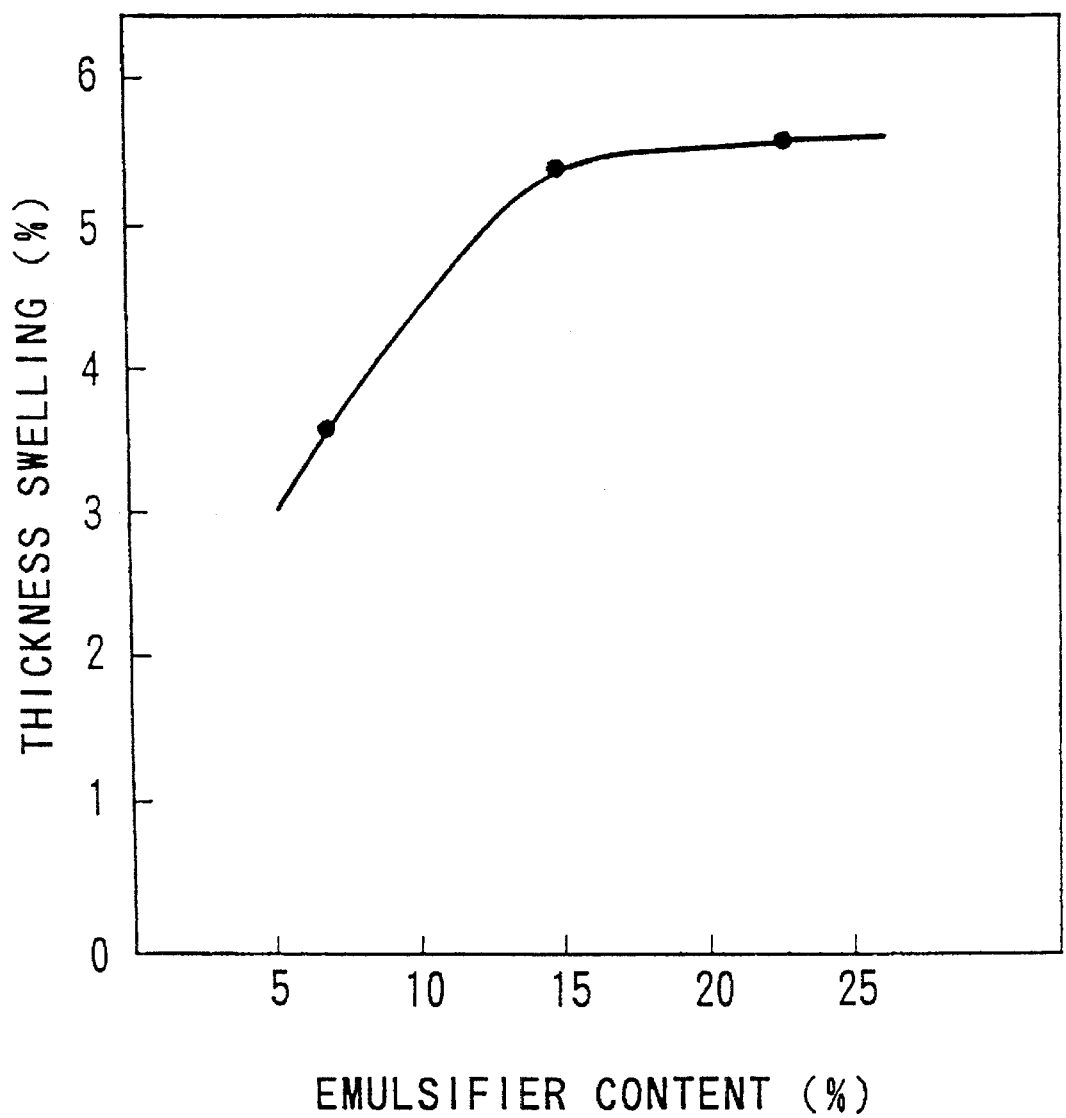
FIG. 3 is a graph showing the relationship between the amount of anion emulsifier present in the water-repellent agent, and the thickness swelling.
Figure 4:
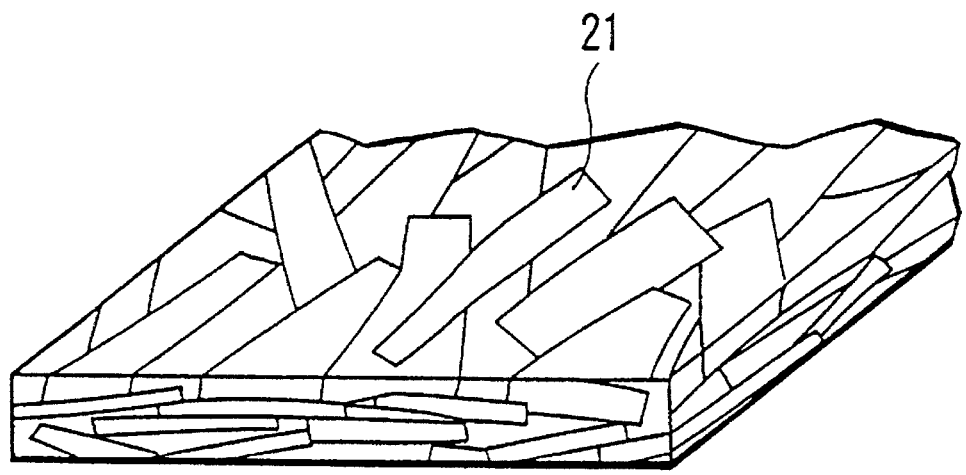
FIG. 4 is a diagram showing an example of a conventional oriented strand board.
Figure 5:
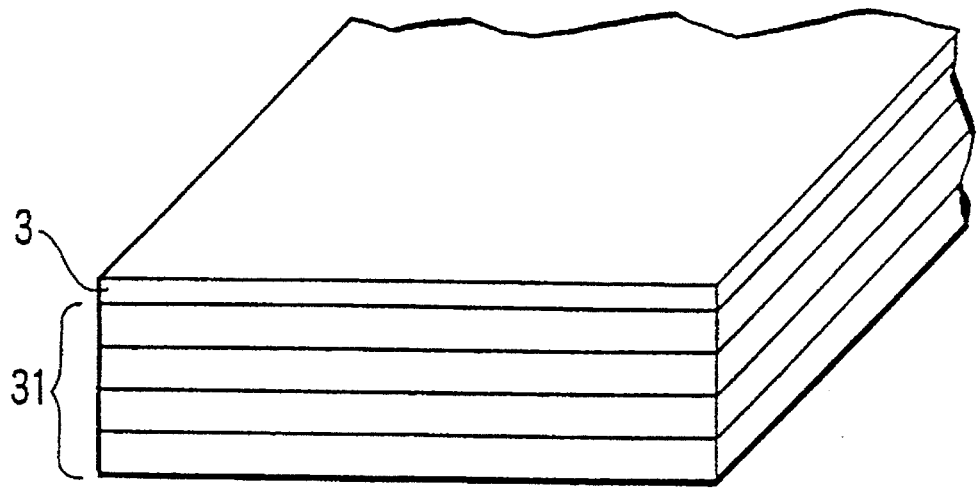
FIG. 5 is a diagram showing the structure of a conventional flooring material.

In the wood board which was molded as described above, in the case in which surface layers 2 are provided on both surfaces of core layer 1, as shown in FIG. 3, a decorative sheet 3 which was separately prepared is applied to at least one surface of the surface layers 2 using an adhesive, and the flooring material of the present invention is thus obtained. Furthermore, in the case in which surface layer 2 is provided on only one surface of the core layer 1, a decorative sheet is applied to this surface layer, and the flooring material of the present invention is obtained. At this time, the surface of the surface layer 2 may be sanded by means of a method which is conventionally employed, and the decorative sheet may be bonded to the sanded surface.

The decorative sheet 3 which is employed here is not particularly restricted; a decorative sheet comprising oak wooden sheet or the like having a thickness within the conventionally employed range of 0.2–1.0 mm may be employed, and the wood board of the present invention has a surface which is particularly smooth and flat, so that even if a thin decorative sheet is employed, the surface of the flooring material will be smooth.

Furthermore, the surface of the decorative sheet 3 may have a urethane coating or the like having a thickness within a range of 40–60 μm.

In accordance with the wood board in accordance with the present invention, in the core layer, molding and integration were conducted using relatively thick thin wooden strands and foaming binder, so that the amount of resin used is small, the density of the wood board which is obtained is low, the foamed binder itself contains microbubbles, so that it has flexibility, and the layer thus possesses a shock-absorbing function with respect to external forces, so that it is difficult to split.

Furthermore, in the wood board in accordance with the present invention, an oriented strand board comprising thinner wooden strands is laminated on at least one surface of the core layer by simultaneous molding, so that the surface is smooth, and the strength and rigidity of the board are improved.

Furthermore, in a preferable embodiment of the present invention, water-repellent agent is added to the binder which is used in the molding of the strand boards comprising the wood board, and this water-repellent agent comprises an aqueous emulsion containing an anion-type emulsifier, so that the water-repellent agent permeates throughout the strand board, and the resistance to moisture is thus improved.

Accordingly, the flooring material of the present invention, which is formed by bonding a decorative sheet to this wood board, has superior resistance to moisture, the surface thereof is smooth, and this flooring material has sufficient strength and rigidity.

EXAMPLES

Next, the wood board and the flooring material in accordance with the present invention will be explained in detail based on examples.

EXAMPLE 1

Thin wooden strands having a length within a range of 75–80 mm, a width within a range of 5–50 mm, and an average thickness of 0.55 mm are produced on a shaving machine (produced by Iwakuragumi Corporation) for use as the thin wooden strands for the core layer. 6 parts per weight of a mixture of foaming urethane resin (crude methylene diphenyl diisocyanate (MDI) produced by Sumitomo-Bayer Urethane, Inc.) and an unconcentrated urea resin in a weight ratio of 2:1 are prepared, and 100 parts per weight of the thin wooden strands described above are placed into a rotating drum rotating at low speed. The foaming binder is applied to the thin wooden strands by means of dispersion using a spray during the thin wooden strands tumbles within the drum.

Thin wooden strands having a length within a range of 30–50 mm, a width within a range of 2–20 mm, and absolute values of the thickness within a range of 0.15–0.20 mm are produced for use as thin wooden strands for the surface layer by means of a shaving machine (produced by Iwakuragumi Corporation). 10 parts per weight of an aqueous phenol binder are prepared, and 100 parts per weight of the thin wooden strands described above are placed in a rotating drum rotating at low speed, and by dispersing the binder by means of a spray as the thin wooden strands tumbled within the drum, the binder is applied to the thin wooden strands.

First, half of the thin wooden strands comprising the surface layer to which binder is applied, arranged in essentially a single direction, are dispersed on a thermal compression plate, and on this, the thin wooden strands for the core layer to which foaming binder is applied are dispersed. Furthermore, on top of laminated layers, the remainder of the thin wooden strands comprising the surface layer are dispersed so that the thin wooden strands are arranged in essentially a single direction, and a three-layered body having a thickness of 150 mm was formed. This three-layered body is subjected to simultaneous thermal compression and molding for 4 minutes and at a temperature of 210° C. and under pressure of 2 MPa, to make the thickness thereof be 12 mm. The wood board which is produced in this manner, in which surface layers are provided on both surfaces of a core layer, has a smooth surface.

The density, flexural strength, and flexural Young's modulus of the wood board described above are measured.

With respect to flexural strength, an evaluation was conducted in accordance with JIS-A 5908. As a result, it is measured that the density thereof is 0.57 g/cm$^3$, the flexural strength was 65 MPa, and the flexural Young's modulus is $71\times10^2$ MPa.

COMPARATIVE EXAMPLE 1

Plywood having a thickness identical to that of the wood board of Example 1 is provided, and the density, flexural strength, and flexural Young's modulus of the plywood are measured in a manner identical to that of Example 1. As a result, it is discovered that the density thereof is 0.58 g/cm$^3$, the flexural strength is 49 MPa, and the flexural Young's modulus is $52\times10^2$ MPa.

It was determined from these results that the wood board in accordance with the present invention possesses density which is equal to or less than that of plywood, and possessed flexural strength which surpasses that of plywood.

EXAMPLE 2

A decorative single sheet comprising oak veneer having a thickness of 0.3 mm is bonded to one surface of the wood strand board which is produced in Example 1, using an aqueous polymeric isocyanate adhesive (produced by Kouyousangyou, KR 7800), at a temperature of 110° C. and applying a pressure of 10 MPa for 3 minutes. As the surface of the wood strand board is smooth, the decorative single sheet is bonded well. Furthermore, after sanding the surface, a urethane coating having a thickness of 50 μm is applied, and a flooring material was thus obtained. The flooring material which is thus obtained had a smooth surface and favorable appearance, because a base strand board thereof is depression free.

The deflection of the above flooring material is evaluated based on the JAS. That is to say, using a flooring material sample having dimensions of 300 mm (width)×1800 mm (length)×12 mm (thickness), and supporting this sample on a span of 700 mm, evaluation is conducted by means of a difference (A-B) between the displacement (A) occurring when a load having a weight of 21 kg is placed on a load bar positioned perpendicularly to the center of the span, and a displacement (B) occurring when a load of 9 kg was similarly placed. When the difference is small, this indicated high rigidity. It is necessary for the deflection value of flooring material to be less than 3.5 mm in accordance with the JAS standards.

As a result, it was determined that the deflection value of the flooring material was 2.3 mm. Accordingly, it is determined that the flooring material in accordance with the present invention met the JAS standards with respect to deflection, and possessed sufficient rigidity for use as flooring material.

EXAMPLE 3

Thin wooden strands having lengths within a range of 75–80 mm, a width within a range of 5–50 mm, and an average thickness value of 0.55 mm are produced for use as materials for the strand board comprising the core layer using a shaving machine (produced by Iwakuragumi Corporation). A mixture of foaming urethane resin (crude MDI produced by Sumitomo-Bayer Urethane Company) and aqueous phenol resin in a weight ratio of 1:1 is used as the binder. An aqueous emulsion of paraffin wax (50% solid component) containing anion emulsifier (Cellozole 428, produced by Chukyou Oil and Fat Company) is used as the water-repellent agent. The contained amount of anion emulsifier is 7% of the solid component. 2 parts per weight of the water repellent agent are added to 8 parts per weight of the binder and are mixed.

Next, 100 parts per weight of the thin wooden strands described above for the core layer are placed in a rotating drum rotating at low speed. The binder is dispersed by means of a spray during the thin wooden strands tumbles within the drum, and thereby, a binder having a water-repellent agent added thereto was applied to the thin wooden strands for the core layer.

Thin wooden strands having a length within a range of 30–50 mm, a width within a range of 2–20 mm, and a thickness within a range of 0.15–0.20 mm were produced for use as materials for the oriented strand boards for the surface layers using a shaving machine (produced by Iwakuragumi Corporation). An aqueous phenol resin is employed as a binder. 2 parts per weight of the water-repellent agent described above were added to 20 parts per weight of the binder, and this is mixed.

Next, 100 parts per weight of the thin wooden strands described above comprising the surface were placed in a rotating drum rotating at low speed, binder was dispersed by means of a spray during the thin wooden strands tumbles within the drum, and thereby, binder having a water-repellent agent added thereto was applied to the thin wooden strands comprising the surface layer.

First, half of the thin wooden strands for the surface layer arranged in essentially a single direction, to which a binder containing a water-repellent agent was applied, were dispersed on a thermal compression plate. On top of this, thin wooden strands for the core layer, to which binder containing a water-repellent agent was applied, were dispersed. Furthermore, on top of the laminated layers, the remainder of the thin wooden strands for the surface layer were dispersed so that the thin wooden strands were arranged in essentially a single direction, and a three-layered body having a thickness of 250 mm was obtained. This three-layered body was subjected to simultaneous thermal compression and molding for a period of 20 minutes and at a temperature of 160° C. and a pressure of 20 kg/cm$^2$ so as yield a thickness of 12 mm. The wood board which was formed in this manner had a smooth surface.

Thickness swelling of the wood board obtained by means of Example 3 was measured based on JIS-A 5908. The results thereof are shown in Table 1.

Comparative Example 2

In place of the anion emulsifier which was contained in the water-repellent agent, a cation emulsifier (Cellozole 651-A) is employed, and otherwise, a procedure is followed which was identical to that of Example 3, and a wood board is produced; thickness swelling thereof is measured based on JIS-A 5908. The results thereof are shown in Table 1.

Comparative Example 3

A wood board is produced in a manner identical to that of Example 3, with the exception that in place of the anion emulsifier which was contained in the water-repellent agent, a non-ionic emulsifier (Cellozole 686) was used. Thickness swelling of this board comprising wooden material is measured based on JIS-A 5908. The result thereof are shown in Table 1.

Comparative Example 4

A wood board is produced in a manner identical to that of Example 3, with the exception that water-repellent agent was not added, and thickness swelling thereof was measured based on JIS-A 5908. The result thereof are shown in Table 1.

TABLE 1

|  | EXAMPLE 3 | COMPARATIVE EXAMPLE 2 | COMPARATIVE EXAMPLE 3 | COMPARATIVE EXAMPLE 4 |
|---|---|---|---|---|
| THICKNESS SWELLING (%) | 3.5 | 6.3 | 5.5 | 7.2 |

As is clear from Table 1, thickness swelling is greatest in Comparative Example 4, to which water-repellent agent is not added. In the case of the Comparative Example 2, in which the emulsifier contained in the water-repellent agent is a cation emulsifier, and in the-case of Comparative Example 3, in which the emulsifier contained in the water-repellent agent is a non-ionic emulsifier, the thickness swelling is greater than 5% so that such boards are clearly deficient in comparison with the thickness swelling of commercial plywood, which is approximately 5%. However, in the case of the wood board of Example 3 according to the present invention, to which a water-repellent agent containing an anion emulsifier is added, the thickness swelling is 3.5%. So that this characteristic surpasses that of conventional plywood. This characteristic enables to have smooth surfaces for floor materials. Furthermore, it improves resistance to moisture after the floor materials are implemented.

EXAMPLE 4

The composition of the water-repellent agent is identical to that in Example 3, and varying the amounts of this water-repellent agent which is added within a range of 0 to 8.0 parts per weight to 100 parts per weight of wooden strands, wood boards are produced in accordance with a method identical to that of Example 3 . The thickness swelling of the various boards comprising wooden material which were obtained were measured based on JIS-A 5908. The results thereof are shown in Table 2.

TABLE 2

| AMOUNT OF WATER-REPELLENT AGENT (PARTS PER WEIGHT) | 0 | 0.5 | 0.8 | 1.0 | 2.0 | 5.0 | 8.0 |
|---|---|---|---|---|---|---|---|
| THICKNESS SWELLING (%) | 7.2 | 6.1 | 4.2 | 3.7 | 3.5 | 3.6 | 3.5 |

From the results shown in Table 2, it can be seen that unless 0.8 parts per weight or more of the water-repellent agent are added with respect to 100 parts per weight of the thin wooden strands, the effects of improving in resistance to moisture is not observed. Furthermore, within the range considered in the present example, it is sufficient if the amount of water-repellent agent added is 0.8 parts per weight or more, so that it is possible to appropriately set the upper limit of the amount thereof added in consideration of material costs and the like.

Comparative Example 5

A wood board is produced by a method identical to that of Example 3, with the exception that the paraffin wax comprising the water-repellent agent was replaced by liquid paraffin, and the water absorption thickness expansion coefficient of this board is measured based on JIS-A 5908. As a result, it is determined that the thickness swelling of the wood board of this Comparative Example 5 is 6.5%, so that it is clearly inferior in resistance to moisture to both the wood board of Example 3 and plywood.

Comparative Example 6

A wood board is produced in a manner identical to that of Example 3, with the exception that the amount of anion emulsifier contained in the water-repellent agent is changed to 15% of the solid component, and the water absorption thickness expansion coefficient thereof was measured based on JIS-A 5908. As a result, it was determined that the water absorption thickness expansion coefficient of the wood board of this Comparative Example 6 is 5.3%.

Comparative Example 7

A wood board is produced in a manner identical to that of Example 3, with the exception that the amount of anion emulsifier contained in the water-repellent agent was 25% of the solid component, and the thickness swelling of this board is measured based on JIS-A 5908. As a result, it was determined that the thickness swelling of the wood board of this Comparative Example 7 was 5.5%.

Using the results of Example 3, Comparative Example 6, and Comparative Example 7, a graph showing the relationship between the amount of anion emulsifier contained in the water-repellent agent and the thickness swelling of the obtained wood board is shown in FIG. 3. It can be seen from this graph that in order to obtain a wood board having a thickness swelling of 5% or less, it is necessary that the amount of anion emulsifier contained in the water-repellent agent be less than 10% of the solid component.

EXAMPLE 5

The density of the wood board in accordance with Example 3 is measured, and the flexural strength and flexural Young's modulus thereof are measured based on the JIS standard.

Furthermore, the density, flexural strength, flexural Young's modulus, and thickness swelling of conventional particle board, oriented strand boards, and plywood having a thickness identical to that of the wood board of Example 3, were measured. The results thereof are shown in Table 3.

TABLE 3

|  | DENSITY (g/cm³) | FLEXURAL STRENGTH (MPa) | FLEXURAL YOUNG'S MODULUS (MPa) | THICKNESS SWELLING (%) |
| --- | --- | --- | --- | --- |
| WOOD BOARD OF EXAMPLE 3 | 0.60 | 47.1 | $60 \times 10^2$ | 3.5 |
| PARTICLE BOARD | 0.73 | 20.9 | $29 \times 10^2$ | 23.1 |
| ORIENTED STRAND BOARD | 0.65 | 34.0 | $32 \times 10^2$ | 12.0 |
| PLYWOOD | 0.52 | 46.3 | $54 \times 10^2$ | 3.6 |

It can be seen from Table 3 that the wood board in accordance with the present invention has a density which is lower than that of conventional particle board or oriented strand boards, and possesses flexural strength and resistance to moisture which is equal to or greater than that of plywood.

EXAMPLE 6

Values of modulous of Rupture (MOR) of the wooden strand boards were measured with respect to (a) parts per weight of resin to 100 parts per weight of wooden strands; (b) weight % of crude MDI resin used as foaming resin to total weight of resin; (c) strand length. These were measured in order to determine preferable range of parameters.

(a) modulus of rupture of wooden strand boards were measured with respect to resin content represented as parts per weight of resin mixed with 100 parts per weight of wooden strands. In this measurement, mixture of crude methylene diphenyl diisocyanate (MDI) and polymeric phenol resin (PPF) is used as resin.

Figure 6A:
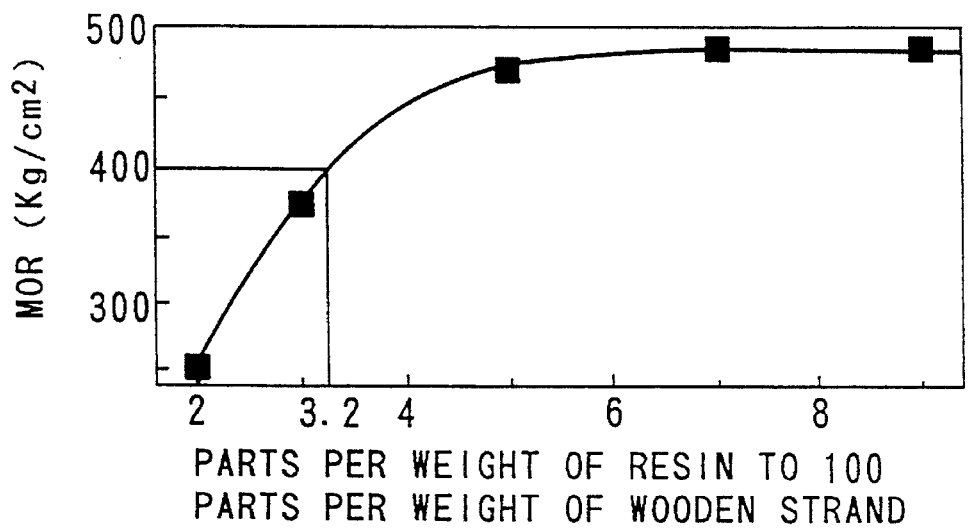
FIG. 6A is a graph showing the relationship between the amount of resin with respect to wooden strand, and modulus of rupture (MOR).

It is seen from FIG. 6A that resin of 5 parts per weight or more has almost constant modulous of rupture about 470 kg force/cm². When resin content is smaller than 3.2 parts per weight, modulous of rupture becomes than about 400 kg force/cm². 400 kg force/cm² is critical value for use as flooring material. When modulous of rupture is smaller than about 400 kg force/cm², a flooring board does not bear weight of ordinary adult, thereby the board is deformed or crack is generated therein. It is preferable to mix resin of 3.2 parts per weight when a strand board is used as a flooring material. It is preferable to determine the upper limit of resin content up to about 15 parts per weight from an economical point of view.

Figure 6B:
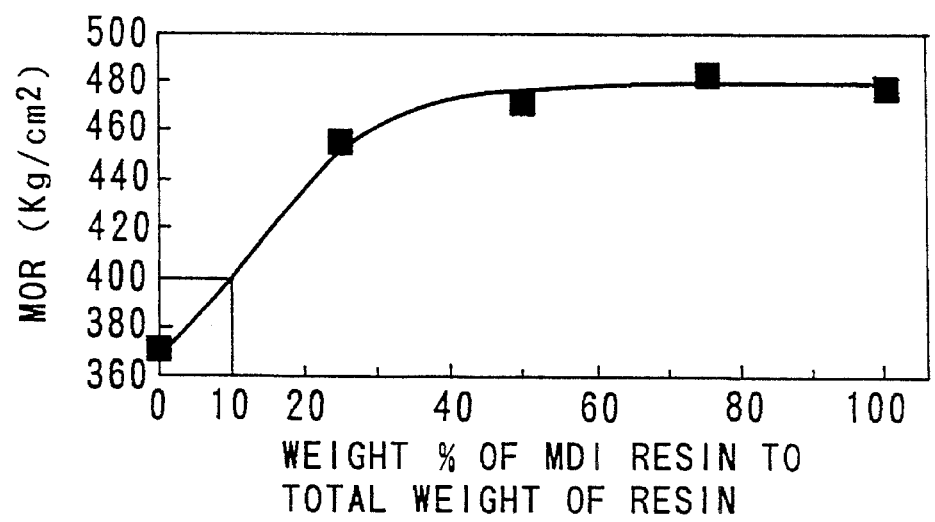
FIG. 6B is a graph showing the relationship between the amount of foaming resin present in the binder, and modulus of rupture (MOR).

(b) modulus of rupture of wooden strand boards are measured with respected to resin weight % of foaming resin (crude MDI resin is used as the foaming resin) to total weight of foaming resin and non-foaming resin (phenol resin is used as the non-foaming resin). FIG. 6B shows the result of the measurement. In this measurement, 5–12 parts per weight of resin, consisting of foaming resin and non-foaming resin, is dispersed to 100 parts per weight of wooden strand. Dots in FIG. 6B indicate mean value of sample values of resin content having 5–12 parts per weight.

It is seen from FIG. 6B that weight % of crude MDI resin is 50% or more, modulous of rupture is constant at about 470 kg force/cm². When weight % of crude MDI resin is smaller than 50 weight %, modulous of rupture gradually becomes smaller. When weight % of crude MDI resin is smaller than 25 weight %, modulous of rupture linearly decreases. When weight % of crude MDI resin becomes smaller than 10%, modulous of rupture becomes smaller than 400 force/cm². 400 force/cm² is the critical value as described before. It is preferable to mix 10 weight % of foaming resin to total weight of foaming resin and non-foaming resin when a strand board is used as a flooring material.

Figure 6C:
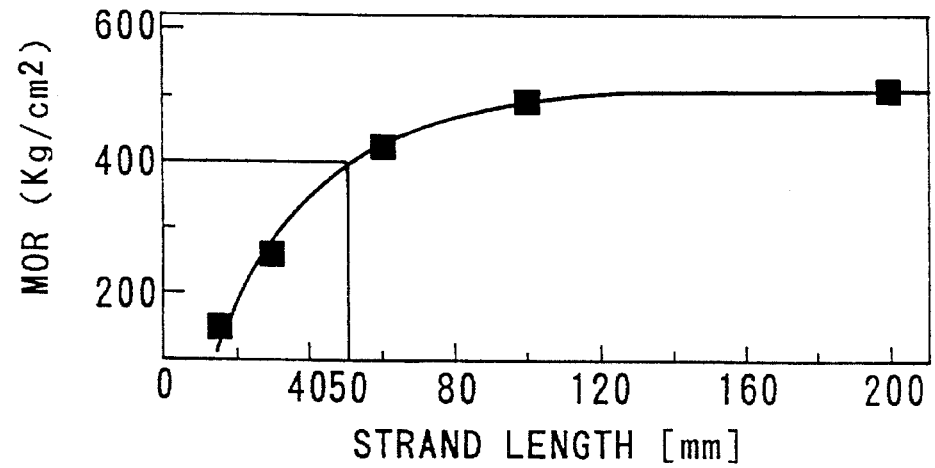
FIG. 6C is a graph showing the relationship between the length of wooden strand and modulus of rapture (MOR).

(c) modulus of rupture of wooden strand boards are measured with respect to strand length of constituent wooden strand. FIG. 6C shows the result of the measurement. In this measurement, 5–12 parts per weight of resin, consisting of foaming resin and non-foaming resin, is dispersed to 100 parts per weight of wooden strand. Each dot in FIG. 6C shows a mean value of sample value of resin content having 5–12 parts per weight.

It is seen from FIG. 6C that length of strand becomes 120 mm or longer, modulous of rupture is constant at about 470 force/cm². When length of strand becomes shorter than 100 mm, modulous of rupture gradually becomes smaller. When strand length becomes shorter than 50 mm, modulous of rupture becomes smaller than 400 force/cm². 400 force/cm² is the critical value as described before. Therefore, it is preferable to use wooden strand having 50 mm length or more to utilized as flooring material.

Wooden strand is deformed and curls during manufacturing process when length of wooden strand becomes longer than 120 mm because of ununiformity of tissue of wood and variation of moisture content. Such deformation causes ununiform distribution of binder and deteriorate mechanical strength of wooden strand board. Therefore, it is preferable to use strand of 120 mm length or less.

As a result, length of wood strand preferably set to be 50–120 mm.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by persons of ordinary skill in the art having reference to this description. It is contemplated that all such changes and additional embodiments are within the spirit and true scope of the invention as claimed below.

What is claimed is:

1. A wood board, comprising:
   a core layer comprising a strand board; and
   a surface layer laminated to at least one surface of said core layer and comprising an oriented strand board;
   wherein said surface layer comprises thin wooden strands thinner than the thin wooden strands comprising said core layer, an average value of the thickness of said thin wooden strands comprising said surface layer being within a range of 0.20–0.50 mm, and an absolute value of the thickness being within a range of 0.08–0.60 mm, and an average value of the thickness of said thin wooden strand comprising said core layer being within a range of 0.60–0.90 mm, and an absolute value of the thickness being within a range of 0.50–1.50 mm.

2. A wood board in accordance with claim 1, wherein thin wooden strands comprising said surface layer are arranged in a longitudinal direction of said wood board.

3. A wood board in accordance with claim 2, wherein thin wooden strands comprising said core layer are arranged in a direction perpendicular to the direction of arrangement of thin wooden strands comprising said surface layer.

4. A wood board in accordance with claim 3, wherein said water-repellent agent is added only to said surface layer.

5. A wood board, comprising:

a core layer comprising a strand board; and a surface layer laminated to at least one surface of said core layer and comprising an oriented strand board;

wherein said surface layer comprises thin wooden strands thinner than the thin wood strands comprising said core layer, said wood board including a water-repellent agent in an amount within a range of 0.8–5.0 parts per weight at a solid component conversion with respect to 100 parts per weight of thin wooden strands comprising said wood board, said water-repellent agent comprising an aqueous emulsion comprising an anion emulsifier and paraffin wax, and containing less than 10% of said anion emulsifier.

6. A wood board in accordance with claim 5, wherein an average value of thickness of thin wooden strands comprising said surface layer is within a range of 0.20–0.50 mm, and an absolute value of the thickness is within a range of 0.08–0.60 mm.

7. A wood board in accordance with claim 6, wherein thin wooden strands comprising said surface layer are arranged in a longitudinal direction of said wood board.

8. A wood board in accordance with claim 5, wherein an average value of the thickness of thin wooden strands comprising said core layer in within a range of 0.60–0.90 mm, and an absolute value of the thickness is within a range of 0.50–1.50 mm.

9. A wood board in accordance with claim 8, wherein thin wooden strands comprising said core layer are arranged in a direction perpendicular to the direction of arrangement of thin wooden strands comprising said surface layer.

10. A wood board in accordance with claim 9, wherein said water-repellent agent is added only to said surface layer.

* * * * *